United States Patent
Lee et al.

(10) Patent No.: US 8,539,251 B2
(45) Date of Patent: Sep. 17, 2013

(54) MEMORY FOR PROTECTING DATA, MEMORY SYSTEM INCLUDING THE MEMORY, AND METHOD OF DRIVING THE MEMORY

(75) Inventors: Byeong Hoon Lee, Seoul (KR); Ki Hong Kim, Suwon-si (KR); Jae Hyoung Park, Yongin-si (KR); Hyuck Jun Cho, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 402 days.

(21) Appl. No.: 12/708,221

(22) Filed: Feb. 18, 2010

(65) Prior Publication Data

US 2010/0229006 A1    Sep. 9, 2010

(30) Foreign Application Priority Data

Mar. 4, 2009  (KR) .................. 10-2009-0018425

(51) Int. Cl.
*G06F 12/14* (2006.01)

(52) U.S. Cl.
USPC ............ 713/189; 713/193; 711/163; 711/164

(58) Field of Classification Search
USPC .................... 713/189, 193; 711/163, 164
See application file for complete search history.

(56) References Cited

U.S. PATENT DOCUMENTS

| 5,377,343 | A | 12/1994 | Yaezawa |
| 7,376,234 | B1 * | 5/2008 | Gardiner ................. 380/259 |
| 2007/0028112 | A1 * | 2/2007 | Mackelden et al. .......... 713/176 |
| 2009/0132831 | A1 * | 5/2009 | Buhr .......................... 713/189 |

FOREIGN PATENT DOCUMENTS

| JP | 2004-039127 | 2/2004 |
| KR | 1998-0011494 | 4/1998 |
| KR | 10-2002-0085753 | 11/2002 |

OTHER PUBLICATIONS

English Abstract for Publication No. 1998-0011494.
English Abstract for Publication No. 10-2002-0085753.
English Abstract for Publication No. 2004-039127.

* cited by examiner

*Primary Examiner* — Jung Kim
*Assistant Examiner* — Ayoub Alata
(74) *Attorney, Agent, or Firm* — F. Chau & Associates, LLC

(57) ABSTRACT

A memory for protecting data includes a first storage area storing a number of encryption keys, a second storage area receiving the encryption keys from the first storage area and storing again the received encryption keys, and a selection unit selecting one of the encryption keys stored in the second storage area according to a control signal, and encoding data input from outside the memory using a selected encryption key or decoding the data stored in the first storage area using the selected encryption key.

17 Claims, 3 Drawing Sheets

MEMORY FOR PROTECTING DATA, MEMORY SYSTEM INCLUDING THE MEMORY, AND METHOD OF DRIVING THE MEMORY

CROSS-REFERENCE TO RELATED APPLICATIONS

This application claims the benefit of Korean Patent Application No. 10-2009-0018425, filed on 4 Mar. 2009, in the Korean Intellectual Property Office, the disclosure of which is herein incorporated by reference in its entirety.

BACKGROUND

1. Technical Field

The inventive concept relates to a memory and a memory system including the memory, and more particularly, to a memory which may prevent encryption keys or data from being exposed outside the memory, a memory system including the memory, and a method of driving the memory.

2. Description of Related Art

In a memory system including a memory storing personal information or important data, to prevent the data stored in the memory from being monitored by, or exposed to, an external attacker, a method of encoding and decoding the data of the memory is used.

In a conventional method of encoding/decoding data of a memory, data input to the memory from the outside is encrypted and stored or encrypted data stored in the memory is decoded and output by using an encryption key having a fixed length, for example, one byte. However, in the data encoding/decoding method, since the same encryption key is used for encoding and decoding data, the data or encryption key may be exposed by external hacking attacks. Also, since a conventional encryption key is stored in a fixed area of a memory, if the area is exposed to the outside, the data or encryption key may become weak to the external hacking attacks.

SUMMARY

According to an exemplary embodiment of the inventive concept, a memory for protecting data includes a first storage area storing N-number of encryption keys, where N is a natural number, a second storage area receiving the N-number of encryption keys from the first storage area and storing again the received N-number of encryption keys, and a selection unit selecting one of the N-number of encryption keys stored in the second storage area according to a control signal, and encoding data input from the outside using a selected encryption key or decoding the data stored in the first storage area using the selected encryption key.

According to another exemplary embodiment of the inventive concept, a memory system for protecting data includes a CPU and a memory communicating data with the CPU.

According to another exemplary embodiment of the inventive concept, a method of driving a memory to protect data includes receiving an input of N-number of encryption keys, wherein N is a natural number, storing again the N-number of encryption keys stored in the first storage area in the second storage area, selecting one of the N-number of encryption keys stored in the second storage area according to a control signal, and encoding data input from outside the memory using a selected encryption key or decoding the data stored in the first storage area using the selected encryption key.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
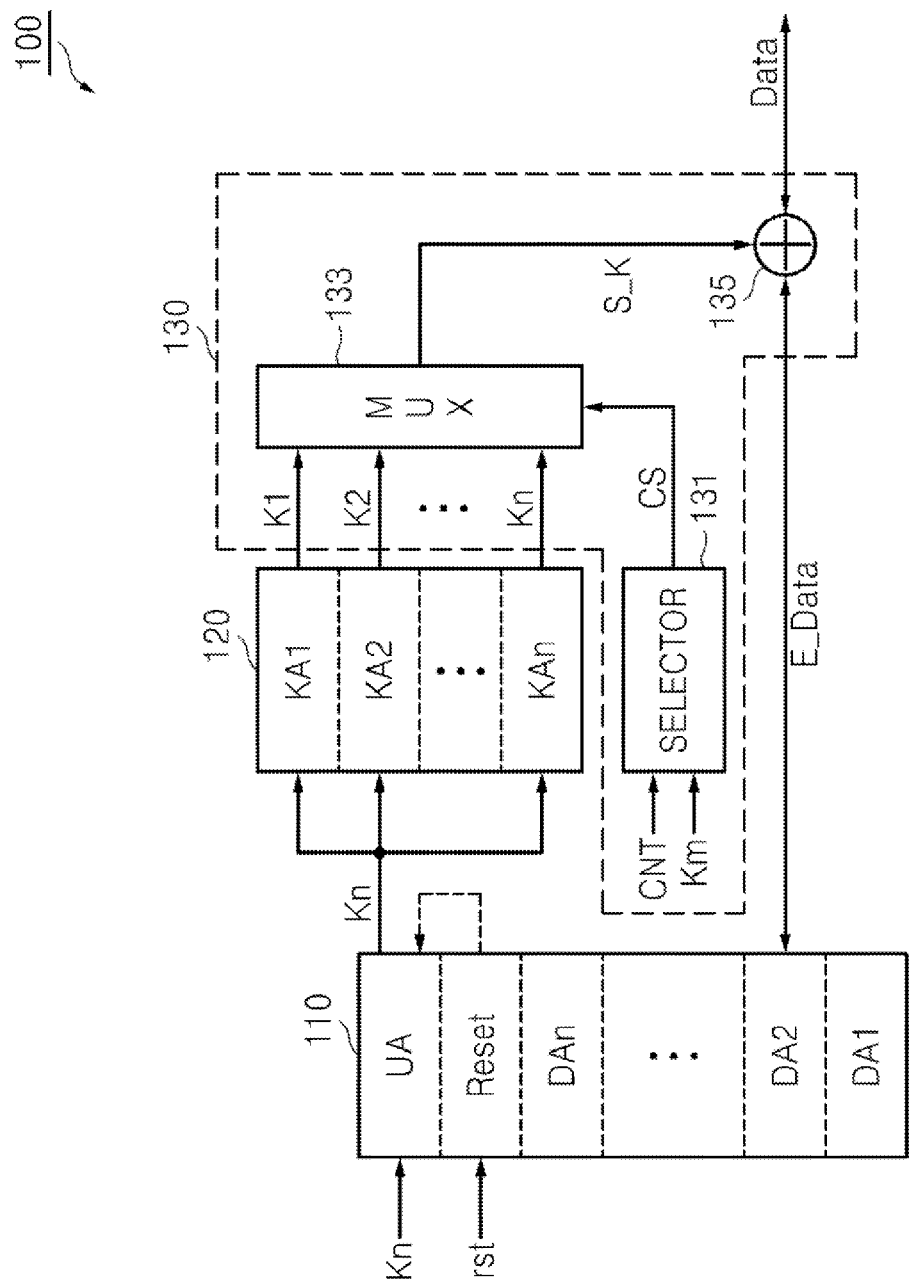
FIG. 1 is a schematic block diagram of a memory for protecting data according to an exemplary embodiment of the present invention.

The attached drawings for illustrating exemplary embodiments of the inventive concept are referred to in order to gain a sufficient understanding of the inventive concept and the merits thereof. Hereinafter, the inventive concept will be described in detail by explaining exemplary embodiments of the inventive concept with reference to the attached drawings. Like reference numerals in the drawings denote like elements.

FIG. 1 is a schematic block diagram of a memory 100 for protecting data according to an exemplary embodiment of the present invention. Referring to FIG. 1, the memory 100 may include a first storage area 110, a second storage area 120, and a selection unit 130. The first storage area 110 includes a plurality of areas. For example, the first storage area 110 may include a plurality of data storage areas DA1, DA2, . . . , DAn, a user storage area UA, and a reset area Reset.

The data storage areas DA1, DA2, . . . , DAn may store data Data that is provided from outside the memory 100 and encoded. The selection unit 130 may generate encoded data E_Data stored in the data storage areas DA1, DA2, . . . , DAn. The user storage area UA may store a plurality of encryption keys, for example, N-number of encryption keys Kn, where "N" is a natural number. Each of the encryption keys Kn may be a code of 1 byte, that is, 8 bits. The encryption keys may be input to a user.

A reset handler may be stored in the reset area Reset. The reset handler may be driven by a reset signal rst input from outside the memory 100, for example, one generated when the user resets the memory 100. The driving of the memory 100 may be initiated from the user storage area UA according to a predetermined command routine.

For example, in addition to the N-number of encryption keys Kn, a plurality of driving commands such as a memory enable code to perform the initial driving of the memory 100 may be further stored in the user storage area UA. Also, a set of commands to initiate the driving of the memory 100 from the user storage area UA by jumping to the user storage area UA of the first storage area 110 when the reset signal rst is input from the outside, may be stored in the reset handler of the reset area Reset.

Accordingly, when the reset signal rst is input to the memory 100, the memory 100 jumps to the user storage area UA by the reset handler, and the driving of the memory 100 is initiated by the initial driving commands of the memory 100 stored in the user storage area UA.

A plurality of areas may be formed in the second storage area 120. For example, the second storage area 120 may include a plurality of encryption key storage areas KA1, KA2, . . . , KAn to respectively store again the N-number of encryption keys Kn and stored in the user storage area UA of the first storage area 110. That is, after the N-number of encryption keys Kn are stored in the user storage area UA of the first storage area 110, the N-number of encryption keys Kn are received from the first storage area 110 and respectively stored again in the encryption key storage areas KA1, KA2, . . . , KAn. This is to prevent deterioration of a logic speed during the encoding/decoding process of the memory 100.

The second storage area 120 may be reset by the reset signal rst that is input from outside the memory 100. When the driving of the memory 100 is initiated from the user storage area UA of the first storage area 110 by the reset signal rst, the N-number of encryption keys Kn output from the first storage area 110 may be stored again in the encryption key storage areas KA1, KA2, . . . , KAn.

The selection unit 130 may include a selector 131, a multiplexer (MUX) 133, and an encoding/decoding unit 135. The selector 131 may be output a selection signal CS according to a control signal CNT. The control signal CNT may be input be the user The selection signal CS provided to the multiplexer 133 may be used as a selection signal to select an encryption key S_K that is any one of the N-number of encryption keys Kn input to the multiplexer 133 from the second storage area 120.

The control signal CNT may include addresses of the data storage areas DA1, DA2, . . . , DAn of the first storage area 110. Thus, the control signal CNT may be used to select a different encryption key for each address of the first storage area 110. For example, the selector 131 may output the selection signal CS to select different encryption keys from the N-number of encryption keys Kn according to the least significant bit (LSB) of each of the addresses of the data storage areas DA1, DA2, . . . , DAn, by the control signal CNT.

For example, when the first data storage area DA1 and the second data storage area DA2 of the data storage areas DA1, DA2, . . . , DAn are respectively defined as an address 00000 and an address 00001, the control signal CNT may control to use different encryption keys for the first and second data storage areas DA1 and DA2 according to each LSB of two different addresses.

Accordingly, to encode the data Data input to the first data storage area DA1 of the memory 100, or decode the encoded data E_Data stored in the first data storage area DA1, according to the control signal CNT, the selector 131 may output the selection signal CS to use a first encryption key k1 of the N-number of encryption keys Kn of the second storage area 120.

Also, to encode the data Data input to the second data storage area DA2 of the memory 100, or decode the encoded data E_Data stored in the second data storage area DA2, according to the control signal CNT, the selector 131 may output the selection signal CS to use a second encryption key k2 of the N-number of encryption keys Kn of the second storage area 120.

Also, the selector 131 may output the selection signal CS to select different encryption keys from the N-number of encryption keys Kn according to the most significant bit (MSB) of each of the addresses of the data storage areas DA1, DA2, . . . , DAn, according to the control signal CNT. For example, when the first data storage area DA1 and the second data storage area DA2 of the data storage areas DA1, DA2, . . . , DAn are respectively defined as an address 00000 and an address 00001, the control signal CNT may control to use the same encryption key for the first and second data storage areas DA1 and DA2 according to each MSB of two identical addresses.

Accordingly, to encode the data Data input to the first and second data storage areas DA1 and DA2 of the memory 100, or decode the encoded data E_Data stored in the first and second data storage areas DA1 and DA2, according to the control signal CNT, the selector 131 may output the selection signal CS to use the first encryption key k1 of the N-number of encryption keys Kn of the second area 120.

A new encryption key Km may be input with the control signal CNT to the selector 131 to output the selection signal CS to select the encryption key S_K from the N-number of encryption keys Kn of the second storage area 120. The new encryption key may also be input by the user.

The multiplexer 133 may receive the N-number of encryption keys Kn from the second storage area 120, and select and output the encryption key S_K that is one of the N-number of encryption keys Kn according to the selection signal CS output from the selector 131. The encoding/decoding unit 135 may encode the data Data input from the outside, based on the encryption key S_K output from the multiplexer 133, and output the encoded data E_Data to the data storage areas DA1, DA2, . . . , DAn of the first storage area 110. The encoded data E_Data may be stored according to the addresses of the data storage areas DA1, DA2, . . . , DAn.

Also, the encoding/decoding unit 135 may decode the encoded data E_Data stored in the first storage area 110 based on the encryption key S_K output from the multiplexer 133 and output the decoded data to the outside.

Figure 2:
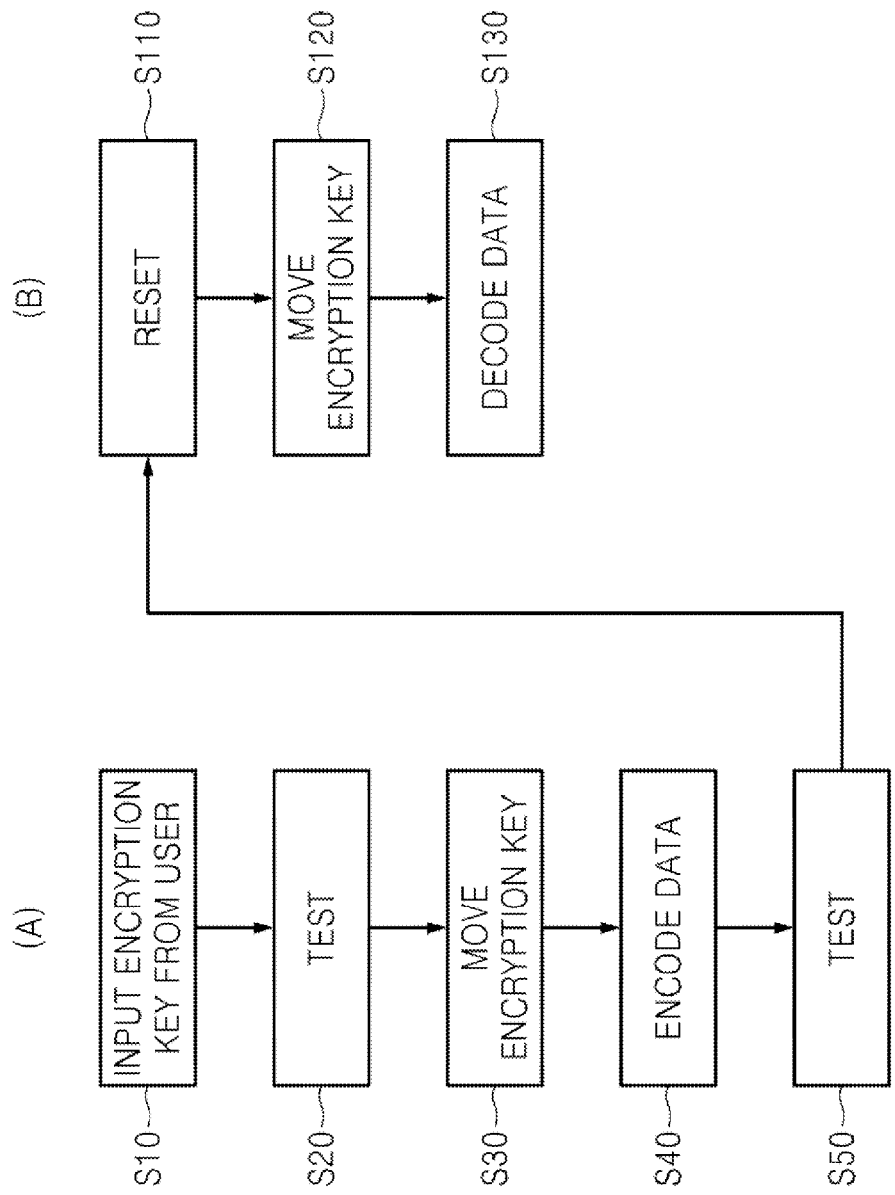
FIG. 2 is a flowchart for explaining the operation of the memory of FIG. 1.

FIG. 2 is a flowchart for explaining an operation of the memory 100 of FIG. 1. Referring to FIGS. 1 and 2, in the method of driving the memory 100, the memory 100 may include two driving processes, for example, a code issuance process A and a code execution process B.

In the code issuance process A, the N-number of encryption keys Kn and the encoded data E_Data are input in the first storage area 110 of the memory 100. The memory 100 may receive the N-number of encryption keys Kn and store the N-number of encryption keys Kn in the user storage area UA of the first storage area 110 of the memory 100 (S10).

The user storage area UA may further store a plurality of driving commands in addition to the N-number of encryption keys Kn. After the reset signal rst is input to the reset area Reset and thus the memory 100 is reset, the reset handler jumping to the user storage area UA to start the operation may be stored in the reset area Reset.

When the input of the N-number of encryption keys Kn is completed, the memory 100 tests suitability of the N-number of encryption keys Kn that are input (S20). When the suitability test is completed, the N-number of encryption keys Kn stored in the user storage area UA may be moved to the second storage area 120 and stored again in each of the encryption key storage areas KA1, KA2, . . . , KAn of the second storage area 120 (S30).

After the N-number of encryption keys Kn is stored again in the second storage area 120, the memory 100 may receive an input of the data Data and encode the input data Data by the encryption key S_K output from the selection unit 130 (S40). For example, when the N-number of encryption keys Kn are stored again in the second storage area 120, the control signal CNT may be input to the selector 131 of the selection unit 130. The control signal CNT may be a signal for outputting the selection signal CS for the selector 131 to select the encryption key S_K from the N-number of encryption keys Kn stored in the second storage area 120. The control signal CNT may control to select a different encryption key for each address of the first storage area 110 of the memory 100 to the selector 131.

When any one encryption key S_K is selected according to the control signal CNT, the selection unit 130 may encode the data Data input from the outside the memory by using the encryption key S_K. The encoded data E_Data may be stored in each of the data storage areas DA1, DA2, ..., DAn of the first storage area 110.

When the data encryption by the selection unit 130 is completed, the memory 100 tests the suitability of the stored encoded data E_Data (S50). As storage of the N-number of encryption keys Kn and the encoded data E_Data is completed in the first storage area 110 of the memory 100, the memory 100 including the encoded data E_Data may be completed.

In the code execution operation B, the encoded data E_Data input in the first storage area 110 may be decoded and output from the memory 100. First, when the code issuance process A of the memory 100 is completed, the reset signal rst may be input to the memory 100 from the outside (S110).

When the reset signal rst is input, the second storage area 120 of the memory 100 is reset and the reset handler stored in the reset area Reset of the first storage area 110 is operated. The reset handler jumps to the user storage area UA of the first storage area 110 according to a predetermined command routine and initiates driving of the memory 100 from the user storage area UA.

The N-number of encryption keys Kn stored in the user storage area UA may be moved to the second storage area 120 and may be stored again in each of the encryption key storage areas KA1, KA2, ..., KAn of the second storage area 120 (S120). The selection unit 130 may select any one encryption key S_K from the N-number of encryption keys Kn stored in the second storage area 120 according to the control signal CNT, and decode the encoded data E_Data provided from the first storage area 110 of the memory 100 by using the encryption key S_K and output the decoded data (S130).

The control signal CNT may control to select a different encryption key for each address of the first storage area 110 of the memory 100 to the selector 131. The control signal CNT may be input under the same conditions as those in the code issuance process A of the memory 100. The data Data output from the memory 100 may be output through a CPU (not shown) or an interface (not shown).

Figure 3:
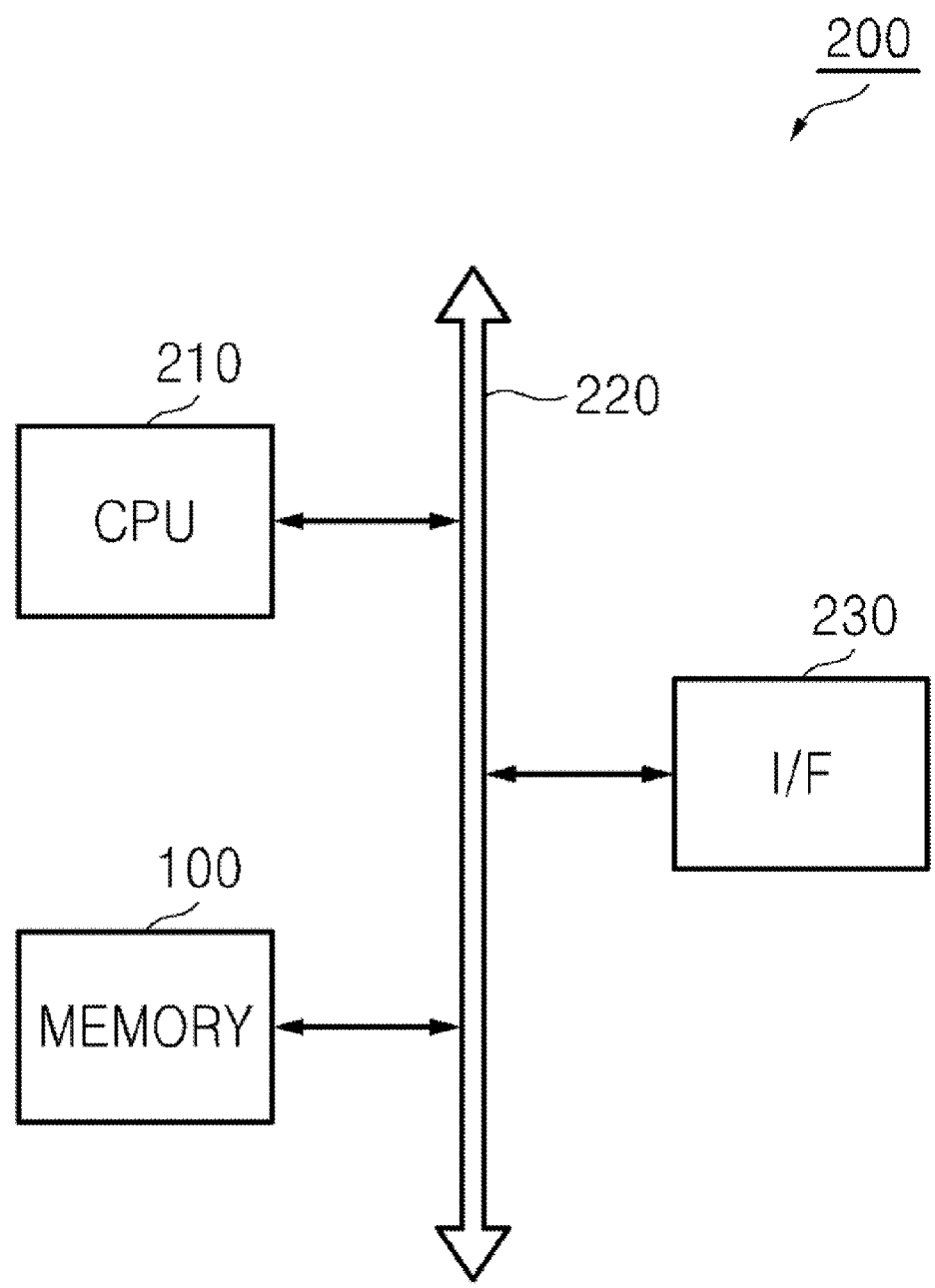
FIG. 3 is a schematic block diagram of a memory system including the memory of FIG. 1.

FIG. 3 is a schematic block diagram of a memory system 200 including the memory 100 of FIG. 1. The memory system 200 according to an exemplary embodiment may be used in a variety of fields, for example, a card system for storing personal information such as a memory card or a smart card, a communications system requiring security, or an RF system.

Referring to FIGS. 1-3, the memory system 200 of the present exemplary embodiment may include a CPU 210, an interface I/F 230, and the memory 100. Since the memory 100 is the same as that described with reference to FIGS. 1 and 2, a detailed description thereof will be omitted herein. The CPU 210 may communicate with the memory 100 via a bus 220 so as to input the data Data to the memory 100 or output the data Data from the memory 100.

The interface 230 may communicate with other external electronic apparatuses, to and provide the data Data input from the outside to the CPU 210 or the memory 100, or transmit the data Data provided by the memory 100 or the CPU 210 to outside the memory system 200. The interface 230 may be a wireless or wired interface and operate according to wired or wireless communications protocol.

As described above, according to an exemplary embodiment of the inventive concept the memory for protecting data, the memory system including the memory, and the method of driving the memory, in the encoding or decoding operation of the memory, an input of an encryption key is directly received from a user and stored in an area that the user knows and an input is selected by applying a different encryption key for each address or a particular area of the memory. Thus, the data of the memory or the encryption key may be prevented from being exposed to external attacks. Also, the encoding or decoding of memory data may be performed reliably.

While the inventive concept has been particularly shown and described with reference to exemplary embodiments thereof, it will be understood that various changes in form and details may be made therein without departing from the spirit and scope of the following claims.

What is claimed is:

1. A memory for protecting data comprising:
a first storage area storing N-number of encryption keys, wherein N is a natural number corresponding to a plurality of encryption keys;
a second storage area receiving every one of the N-number of encryption keys from the first storage area and storing again the every one of the received N-number of encryption keys at substantially a same time that the every one of the N-number of encryption keys are stored in the first storage area; and
a selection unit selecting one of the N-number of encryption keys stored in the second storage area according to a control signal, and encoding data input from outside the memory using a selected encryption key or decoding the data stored in the first storage area using the selected encryption key,
wherein the selection unit selects one of the N-number of encryption keys stored in the second storage area according to a least significant bit (LSB) of each of a plurality of addresses corresponding to a plurality of data storage areas of the first storage area, wherein the plurality of addresses are included in the control signal.

2. The memory of claim 1, wherein the selection unit comprises:
a selector outputting a selection signal according to the control signal;
a multiplexer selecting the selected encryption key of the N-number of encryption keys stored in the second storage area according to the selection signal; and
an encoding/decoding unit encoding data input from the outside, or decoding the data stored in the first storage area, based on the selected encryption key.

3. The memory of claim 2, wherein the selector outputs the selection signal to select the encryption key that is different for each of addresses of the first storage area according to the control signal.

4. The memory of claim 2, wherein the selector outputs the selection signal to select the encryption key based on another encryption key input with the control signal.

5. The memory of claim 1, wherein the first storage area comprises:
a data storage area storing encrypted data;
a user storage area storing the N-number of encryption keys; and
a reset area storing a reset handler to initiate an operation from the user storage area according to a reset signal input from outside the memory, wherein, when the reset signal is input from outside the memory, the second storage area is reset by the reset signal and receives and stores again the N-number of encryption keys from the user storage area of the first storage area that is operated by the reset handler.

6. The memory of claim 1, wherein each of the N-number of encryption keys is one byte code data.

7. The memory of claim 1, wherein the first storage area receives and stores the N-number of encryption keys from a user input.

8. The memory of claim 1, wherein the control signal is a user input.

9. A memory system for protecting data, the memory system comprising:
- a CPU; and
- a memory communicating data with the CPU, wherein the memory comprises:
  - a first storage area storing N-number of encryption keys, wherein N is a natural number corresponding to a plurality of encryption keys;
  - a second storage area receiving every one of the N-number of encryption keys from the first storage area and storing again the every one of the received N-number of encryption keys at substantially a same time that the every one of the N-number of encryption keys are stored in the first storage area; and
  - a selection unit selecting one of the N-number of encryption keys stored in the second storage area according to a control signal, and encoding data input by the CPU using a selected encryption key or decoding the data stored in the first storage area using the selected encryption key and outputting the decoded data to the CPU,
  - wherein the selection unit selects one of the N-number of encryption keys stored in the second storage area according to a least significant bit (LSB) of each of a plurality of addresses corresponding to a plurality of data storage areas of the first storage area, wherein the plurality of addresses are included in the control signal.

10. The memory system of claim 9, wherein the selection unit comprises:
- a selector outputting a selection signal according to the control signal;
- a multiplexer selecting the selected encryption key of the N-number of encryption keys stored in the second storage area according to the selection signal; and
- an encoding/decoding unit encoding data input by the CPU, or decoding the data stored in the first storage area, based on the selected encryption key, and outputting the decoded data to the CPU.

11. The memory system of claim 9, wherein the first storage area receives and stores the N-number of encryption keys from a user input.

12. The memory system of claim 9, wherein the control signal is a user input.

13. A method of driving a memory to protect data, the method comprising:
- receiving an input of N-number of encryption keys in a first storage area, wherein N is a natural number corresponding to a plurality of encryption keys;
- storing again every one of the N-number of encryption keys stored in the first storage area in a second storage area at substantially a same time that the every one of the N-number of encryption keys are stored in the first storage area;
- selecting one of the N-number of encryption keys stored in the second storage area according to a control signal; and
- encoding data input from outside the memory using the selected encryption key or decoding the data stored in the first storage area using the selected encryption key,
- wherein selecting one of the N-number of encryption keys stored in the second storage area is based on a least significant bit (LSB) of each of a plurality of addresses corresponding to a plurality of data storage areas of the first storage area, wherein the plurality of addresses are included in the control signal.

14. The method of claim 13, wherein the selecting of one of the N-number of encryption keys stored in the second storage area comprises:
- outputting a selection signal according to the control signal input by the user; and
- selecting one of the N-number of encryption keys stored in the second storage area according to the selection signal, and wherein, in the outputting of a selection signal according to the control signal, the selector outputs the selection signal to select the selected encryption key that is different for each of addresses of the first storage area according to the control signal, or the selection signal to select the selected encryption key based on another encryption key input with the control signal.

15. The method of claim 13, wherein the first storage area receives and stores the N-number of encryption keys from a user input.

16. The method of claim 13, wherein the control signal is a user input.

17. The method of claim 13, further comprising:
- performing a suitability test of the N-number of encryption keys prior to storing again the N-number of encryption keys in the second storage area.

* * * * *